March 31, 1953 J. A. LASATER 2,633,105
VANE TYPE FLUID MOTOR
Filed May 16, 1950 2 SHEETS—SHEET 1

INVENTOR
John A. Lasater
BY
C. H. Bryant
ATTORNEY

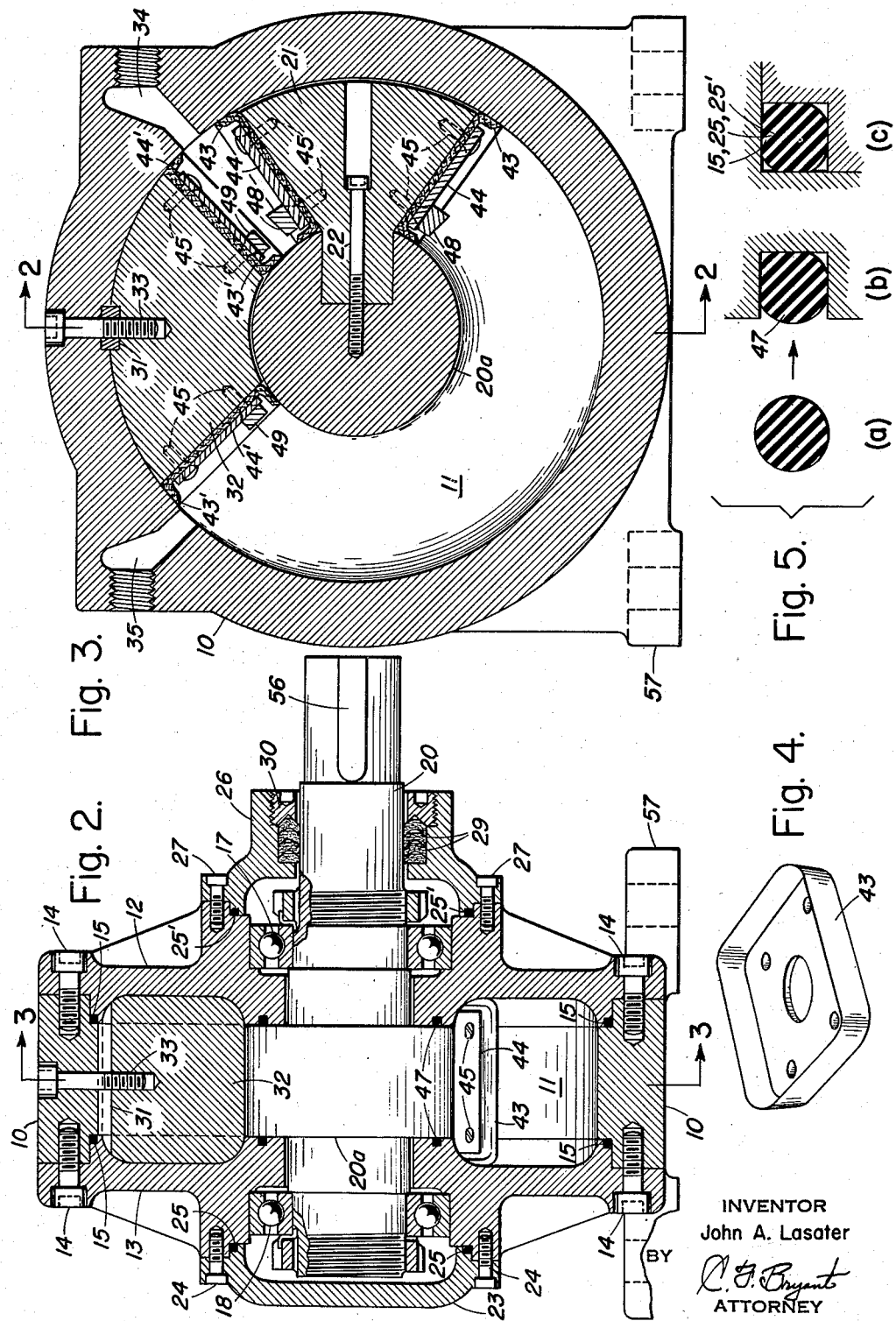

Patented Mar. 31, 1953

2,633,105

UNITED STATES PATENT OFFICE 2,633,105

VANE TYPE FLUID MOTOR

John A. Lasater, Chattanooga, Tenn., assignor to Combustion Engineering-Superheater, Inc., New York, N. Y., a corporation of Delaware Application May 16, 1950, Serial No. 162,282

1 Claim. (Cl. 121—97)

This invention relates to improvements in hydraulic motors of the type: (a) in which fluid supplied from an outside source imparts limited rotation to the motor shaft; and (b) to which the term "hydraulic rotating cylinder" may appropriately be applied.

Broadly stated, the object of this invention is to improve the design, better the performance and extend the usefulness of such fluid driven motors.

A more specific object is to increase the ruggedness, durability and reliability of these hydraulic motors and to lower the cost of manufacturing, installing and operating same.

Another object is to provide a design which occupies a minimum of space and which lends itelf to convenient selection of desired torque capacity.

A further object is to provide improved means for sealing abutting stationary parts against leakage of the high pressure fluid that is forced into the motor interior for the purpose of producing shaft rotation.

An additional object is to provide improved means for establishing pressure-tight seals between parts of the motor which move one relative to another during the aforesaid shaft rotation.

Still further objects and advantages of this invention will become apparent from the following description of an illustrative embodiment thereof when taken in conjunction with the accompanying drawings wherein:

Figure 2 is a sectional side view of the improved cylinder taken along line 2—2 of Figs. 1 and 3 and showing further details of internal construction;

Figure 3 is a sectional end view of the cylinder as viewed from line 3—3 of Fig. 2;

Figure 4 is a perspective representation of one of the cup-like leather packings with which the shaft-carried vane or paddle is provided;

Figure 5 is a series of representations showing further details of the O ring seals novelly employed by the cylinder at the several points indicated in Fig. 2.

Figure 1:
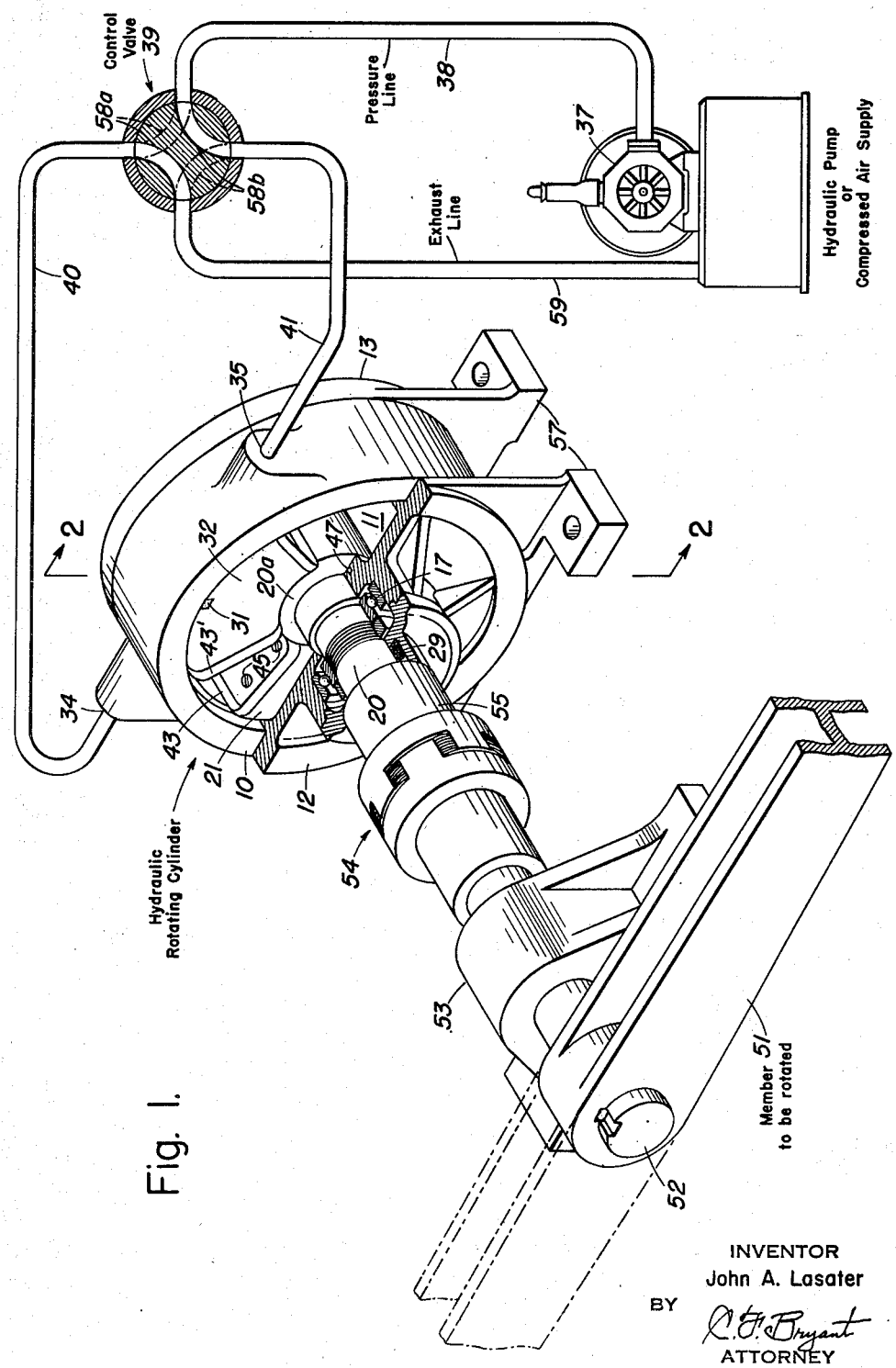
Figure 1 is a diagrammatic showing, partly schematic and partly in cut-away perspective, of the improved hydraulic motor or rotating cylinder coupled to a member that is to be rotated through 180° and supplied with operating fluid through conduit means which include a control valve.

In the invention as illustrated there is provided a main casing or cylinder body 10 having a bore 11 and removable end closure plates 12 and 13 each held against the casing body 10 by cap screws shown at 14 in Fig. 2. Leak-proof joints between these abutting parts are assured by O ring gaskets 15 formed of synthetic rubber and arranged as more fully described at a later point herein.

Bearings 17 and 18 carried by these end closure plates 12 and 13 support the motor shaft 20 within the cylinder body 10 centrally thereof and extending axially therethrough. A length of this shaft 20 intermediate the bearings 17—18 is enlarged as shown at 20a, and carried by this enlarged shaft portion is a vane or paddle 21 held in the represented shaft slot by a cap screw 22. Although ball bearings are here shown at 17 and 18 it will be understood that roller bearings or the like also may be employed; moreover, both ends of the shaft 20 may be extended to the exterior of the motor instead of only the one shaft end (right in Fig. 2) which the drawings hereof show.

In the construction illustrated, a removable bearing cap 23 secured to end plate 13 by bolts 24 covers bearing 18 and the end of shaft 20 supported thereby; an O ring gasket 25 being used to provide a pressure-tight seal. Similarly, the other bearing 17 is covered by a removable cap member 26 secured to end plate 12 by cap screws 27 and sealed therewith through O ring gasket 25'. This cap member surrounds shaft 20 and makes with the protruding end thereof a pressure-tight seal established in any suitable manner as through the use of packings 29 compressed against the shaft by threaded insert ring 30.

A partition block 32 is stationarily held against the inner top of cylinder body 10 by means of a cap screw 33, and it there defines a lengthwise partition through the cylinder interior along the upper side of shaft 20; a locking key 31 further restraining the partition against rotative movement inside the cylinder. As here shown this partition block 32 has the segmental shape indicated by Figs. 1 and 3 as spanning approximately 45° of the interior cylinder body arc; and it leaves the vane 21 free to rotate with the motor shaft 20 through the remaining arc of the cylinder body's interior 11 not occupied by said block 32. Other designs for this partition member 32 obviously are possible.

In the design illustrated a first inlet port 34 on one side of this partition block 32 admits into the interior of cylinder body 10 fluid for driving the paddle 21 and shaft 20 in one direction; and a second inlet port 35 on the other side of partition 32 similarly admits fluid for driving the paddle and shaft in the opposite direction. Although these ports 34 and 35 are here shown as entering the casing 10 outside the limits of partition block 32, it will be obvious that entry along the block sides within the limits of those sides may in some cases be preferred.

The named operating fluid admitted through the aforesaid ports 34 and 35 may take the form either of compressed air or of oil or other liquid under pressure; and it may be supplied to the hydraulic motor through any suitable piping arrangement such as that shown by Fig. 1 as including a pump or compressor 37 which feeds through pressure line 38 into control valve 39 and thence through one or the other of conduits 40 and 41 to one or the other of the aforesaid inlet ports 34 and 35.

The fluid pressure called for by such a system may be as high as 500 or even 1000 lbs. per square inch, and considerable difficulty has in the past been encountered in sealing the various parts of a fluid motor against such pressures. The present invention overcomes this difficulty in the practical and satisfactory manner now to be explained.

Looking first at the shaft-carried paddle or vane 21, each side thereof is provided with a leather packing 43 having the cup shape best shown by Fig. 4. This shape is such that the upturned edge of the leather cup fits on all sides against the surrounding wall of casing bore 11 and establishes a leak-proof seal therewith. A retaining plate 44 urged towards the gasketed paddle face by four screws 45 (two on each side) holds each packing 43 in proper place thereagainst.

Similar packings 43' are provided on the two sides of the partition block 32 where they are retained in place by plates 44'; these parts being generally similar to the corresponding parts on vane 21. It will be noted that one edge of each of these block packings 43' contacts the enlarged shaft portion 20a and thus prevents flow of the operating fluid from either side of vane 21 towards the other between partition block 32 and said shaft portion; it already having been seen that said operating fluid for rotating the vane 21 and shaft 20 is admitted into the casing interior through one or the other of ports 34 and 35.

Also provided between the two shoulder faces of enlarged shaft portion 20a and the abutting inner faces of body end plates 12 and 13 are O ring packings 47 carried in grooves in those plate faces and serving to prevent flow of high pressure fluid from the casing bore 11 inwardly along said shoulder faces and thence outwardly along the main shaft 20 towards each of the bearings 17 and 18 which support the shaft. Such fluid-flow stoppage is supplemented at bearing 18 by the cap 23 and its sealing O ring 25, and at bearing 17 by the cap 26 and the shaft packing 29 which additionally assists in confining the operating fluid to within the motor interior.

Overtravel of the shaft-carried vane or paddle 21 in either direction is prevented by stop bars 48 mounted on the retaining plates 44 for the vane packings 43 and there positioned to abut with cooperating stop bars 49 carried by the retaining plates 44' for the partition block packings 43'. Each of these stop bars 48—49 may be secured to its carrying plate 44 in any suitable manner, such as by welding; and in the arrangement shown each bar extends axially (i. e. parallel to motor shaft 20) along the associated plate intermediate the two plate-holding screws 45 (only one shown in Fig. 3) that are closest to the enlarged shaft portion 20a. The use of larger stop bars 48 each mounted more centrally of its carrying plate 44 also may be preferred in certain instances.

From Fig. 3 it will be seen that each of these vane-carried stop bars 48 will bear against its cooperating stationary or block-carrying stop bar 49 while the edge of the vane packing 43 is still spaced from the facing edge of the block-carried packing 43' being approached. This safeguards both packings against injury due to arrival of the shaft-carried vane 21 at either extreme in its range of rotation travel.

Looking further at the O ring gaskets designated as 15, 25 and 25' in Fig. 2 and the O ring packings designated as 47 in the same view, each of these takes the form of a complete unbroken ring of highly resilient synthetic rubber having a circumferential length suitable for fitting into the particular groove provided therefor in the motor part to be sealed. In cross section each of these O rings has the circular shape shown at (*a*) in Fig. 5; the original or undistorted cross sectional diameter thereof being somewhat greater than the height and width dimensions of the groove that is to accommodate the ring.

A fitting of the O ring into said groove is therefore accompanied by the compressive contour change thereof which each of the showings (*b*) and (*c*) of Fig. 5 indicates; said contour change making possible a leak-proof seal that is highly effective while being relatively inexpensive and simple to install. In a hydraulic motor such as here disclosed the resultant advantages are especially significant; this new and unique sealing expedient having contributed markedly to the practical operating success of the complete motor unit.

How that complete unit operates will have become apparent from the foregoing description of the component parts making up the unit. Referring to Fig. 1 the device or member 51 to be rotated, through a range here assumed to be 180°, is keyed to shaft 52 carried in bearing 53 and coupled to shaft 20 of the hydraulic cylinder or motor in any suitable manner as through coupling 54; the motor half 55 of said coupling being secured to shaft 20 as by the aid of a keyway shown at 56 in Fig. 2, and the cylinder body or casing 10 being held stationary through attachment of the casing's end feet 57 to a mounting frame (not shown) or other suitable support.

In the representation of Fig. 1 the full lines show this member 51 after having been moved by cylinder vane 21 to one extreme in its range of rotative travel wherein said cylinder vane 21 occupies the position represented by each of Figs. 1 and 3, while the dotted lines show the position that member 51 takes after said vane or paddle 21 has rotated it (counterclockwise as viewed in Fig. 1) through 180° to the other extreme in its travel range.

In the arrangement of Fig. 1 the last named rotative movement of shaft 20 (clockwise as viewed in Fig. 3) can be produced by shifting control valve 39's central portion through 90° so that the valve ports 58 occupy the positions shown dotted. Fluid under pressure (as from pump 37) thereupon flows through line 38 and valve port 58a into pipe 40 and thence through motor inlet 34 into the interior of casing 10 where it urges paddle 21 and cylinder shaft 20 in the counterclockwise rotative direction as viewed in Fig. 1 (clockwise as viewed in Fig. 3); the fluid on the other side of paddle 21 then exhausting from the cylinder interior 11 by way of passage 35 and pipe 41 for discharge through valve port 58b into exhaust line 59. The aforesaid flow of fluid from pressure line 38 into inlet port 34 will, if continued, cause the motor shaft 20 to rotate member 51 in what is here designated as the "reverse" direction (counterclockwise as viewed in Fig. 1) from the position shown by full lines to the position shown by dotted lines.

Return of member 51 in the opposite rotative direction (herein designated as "forward") from said dotted-line position to the full-line position of Fig. 1 may now be accomplished by placing control valve 39 back into the port setting which Fig. 1 shows by full lines. In such setting fluid from pressure supply line 38 flows through valve port 58b and pipe 41 into motor inlet 35 and thus urges vane 21 in the opposite direction (clockwise in Fig. 1 and counterclockwise in Fig. 2) and with it motor shaft 20 and member 51.

Stoppage of the cylinder vane 21 and its carrying shaft 20 at any intermediate position within the vane travel range is accomplished simply by shifting control valve 39's central portion 45° from the setting shown. This disconnects pressure and exhaust lines 38 and 59 from both of pipes 40 and 41 and also closes each of those motor-connected pipes at its valve end; thereby confining inside of the cylinder 10 all operating fluid that is on both sides of the vane 21. Such valve manipulation thus enables the rotated member 51 to be stopped and held in any position desired.

The rotating cylinder construction herein disclosed and described offers a number of significant advantages. For example, the various component parts thereof are easily manufactured and assembled, and the resultant complete device is exceedingly low in cost, rugged and compact in design, and highly reliable in operation.

Moreover, for each diameter of the cylinder body 10 the torque capacity of the unit may readily be changed simply by varying the axial dimension of said body 10 and of the enlarged shaft portion 20a plus shaft-carried vane 21 and partition block 32; the body end plates 12 and 13, the bearings 17 and 18, and end caps 23 and 26 undergoing no alteration incident to such change. Thus the torque capacity of the illustrated cylinder may be doubled by providing a vane 21 (and other cooperating parts) twice as long as the vane here shown; the cup-shaped packings 43—43' being similarly lengthened.

Furthermore, the movable parts of the device have been sealed against leakage of the operating fluid in a unique and superior manner through the disclosed use of cup-shaped packings 43 and 43' on the shaft vane 21 and on the partition block 32, and also through the disclosed use of O ring packings 47 between the shoulders of enlarged shaft portion 20a and cooperating faces of the body end plates 12 and 13.

Still further, sealing of abutting stationary parts against leakage of the high pressure operating fluid also has been accomplished in an improved and superior manner through the disclosed use of O ring gaskets 15, 25 and 25' which gaskets fit into grooves therefor as shown and which effectively close any open spaces between the parts that abut along those grooves.

Advantages such as these give my new hydraulic rotating cylinder a degree of practicability not heretofore attainable in devices of this general character. In consequence the improved hydraulic motor here shown has already been placed in successful use under operating conditions which could not satisfactorily be dealt with prior to my making of the present invention. One typical installation which utilizes twelve of these new motors is disclosed by co-pending application Serial No. 200,899 filed December 15, 1950 in the names of Samuel C. Northington, Jr. and John A. Lasater under title of "Apparatus and Technique for Assembling Foundry Molds"; the mechanism there disclosed including five of these new hydraulic motors for flask turn over service, five more of these motors for flask-arm spreading and reclosing, and two more of these motors for core box turn over service.

The improvements of this invention are therefore extensive in their application and hence also may be utilized with hydraulic rotating cylinders which have constructional details differing from those here shown and described by way of illustration.

What I claim is:

A vane type fluid motor comprising two centrally apertured disks coaxially arranged with adjacent faces having matching annular relieved portions coaxial with said disks and of generally U-shape cross section, a ring spacer disposed between and secured to each of said disks radially outward of said relieved portions thereby maintaining said disks in spaced relation, said ring spacer being coaxial with said disks, a shaft centrally received by the apertures in said disks and having a radially enlarged portion disposed between said disks with an axial dimension substantially equal to the space between the two disks and extending radially to a point corresponding to the innermost extremity of the relieved portions, said disks having an annular groove in the portions of the inner face that overlie the ring spacer and the radially enlarged portion of the shaft, toroidal seals disposed in said grooves and having a sectional diameter sufficiently greater than the depth of the groove so that said seal is in compression engagement with the disks and the associated ring spacer and radially enlarged portion of the shaft, bearing means rotatably supporting said shaft coaxially of said disks, said bearing means being disposed on said shaft and snugly received in counterbores adjacent the outer face of each of said disks, a cover means encompassing one end of said shaft, means including a toroidal seal sealably securing said cover means to the outer face of the adjacent disk, a cap member sealably secured to outer face of the other disk and having an opening through which the shaft projects with packing material forceably retained in said opening in engagement with said shaft, a partition block of limited angular dimension secured to the spacer ring and disposed in the annular chamber defined by the two matching annular relieved portions, the spacer ring and the radially enlarged portion of the shaft, said partition block having a cross section substantially equal to that of the said annular chamber, passage means communicating with said annular chamber immediately beyond each end of the partition block, a vane secured to the shaft and disposed within the remaining portion of said annular chamber, said vane having an angular dimension substantially less than the angular dimension of said remaining portion of the annular chamber and a cross section substantially equal to that of said annular chamber, a plate member secured to each of the ends of the partition block and the vane member that are exposed to the annular chamber, a resilient packing member secured between said plate members and the ends of the partition block and the vane, said packing member having an upturned rim extending away from said ends and contacting the walls of annular chamber on all sides, and stop means secured to each of said plates operable to arrest movement of the vane at the extreme ends of its rotation prior to engagement of the lips of adjacent packing members.

JOHN A. LASATER.

REFERENCES CITED

The following references are of record in the file of this patent:

UNITED STATES PATENTS

| Number | Name | Date |
|---|---|---|
| 1,077,568 | Sullivan et al. | Nov. 4, 1913 |
| 1,473,199 | Peraza | Nov. 6, 1923 |
| 1,799,294 | Gough | Apr. 7, 1931 |
| 2,465,761 | Staude | Mar. 29, 1949 |

FOREIGN PATENTS

| Number | Country | Date |
|---|---|---|
| 1,048 | Great Britain | May 9, 1855 |
| 7,560 | Great Britain | Apr. 21, 1892 |
| 50,262 | Switzerland | Jan. 5, 1910 |
| 485,545 | Germany | Nov. 1, 1929 |
| 659,330 | Germany | Apr. 30, 1938 |